United States Patent Office 3,316,081
Patented Apr. 25, 1967

3,316,081
SELF-FLUXING FEED STOCK FOR IRON AND STEEL PRODUCING FURNACES AND METHOD FOR PRODUCING SAME
Billy B. Bratton, 1461 Maple Drive, Apt. 10, Pittsburgh, Pa. 15227
No Drawing. Filed Sept. 10, 1963, Ser. No. 307,811
7 Claims. (Cl. 75—3)

This invention relates broadly to the manufacture of briquettes for feed stock in the production of iron and steel and more particularly to the manufacture of a self-fluxing briquette containing iron bearing material normally too small to employ as feed stock.

A practical manner of utilizing iron ore fines (i.e., under ¼ inch), mill scale, flue dust and other fine iron bearing particles such as shavings, chips and grindings in the production of iron and steel has long been a problem in the industry. Many suggestions for using these materials have been made over the years including mixing them with slag and pouring them into bricks and sintering them. The most prevalent method employed today involves sintering the product to insure heavy density, satisfactory strength or abrasion resistance and removal of water of hydration. Sintering as those skilled in the art are well aware of, is an involved and expensive operation and eats up most of the savings resulting from using these fines which otherwise might be wasted.

My invention not only eliminates sintering altogether at tremendous savings but also produces a product which is self fluxing and as useful as, if not more useful than, normal high grade iron ore. The product of my invention is a briquette of dense, abrasion resistant, high iron content characteristics of uniform quality weight and size with a controlled chemical analysis admirably suitable for use in blast furnaces, open hearth furnaces, cupolas or other iron and steel producing furnaces as a substitute for regular feed stock or scrap iron materials.

In accordance with the invention, I mix a quantity of finely divided iron bearing materials of at least 50% iron content together with flux containing material in an amount sufficient to make the final material self fluxing. At least a portion of said flux containing material being molten slag in a quantity sufficient at least to fill the void spaces between the solid materials and form a matrix therefore, forming briquettes of the mix and thereafter permitting the briquettes to cool and harden.

Preferably the solid and liquid materials are mixed in a jet aspirator under a partial vacuum to assure thorough mixing and elimination of voids or air bubbles in the mix.

Furthermore, I preferably premix all solid materials, if more than one is used, to provide a uniform constituent of solids for the solid-liquid mixing step.

Accordingly, I have produced a new article of manufacture that is a self-fluxing feed stock of high iron content for iron and steel producing furnaces in the form of a briquette composed of finely divided iron bearing material uniformly disposed in a matrix of slag that is dense, abrasion resistant, uniform in size quality and content and contains sufficient flux bearing material to at least flux the total silica content of the briquettes and which is composed of materials not otherwise ordinarily suited for such use and without employing any sintering process.

Among the finely divided iron containing material available for use in my invention are iron ore fines (ore under ¼ inch size) iron ore concentrates (such as produced from taconite and hematite ores), mill scale, flue dust, and other iron bearing materials such as shavings, chips, grindings and the like.

The above named iron containing materials can be used alone or in any number of quantity combinations or blends, but I assume that the bulk of this constituent of my invention will be of iron ore fines because this is the most available in quantity of the materials. The only prerequisite for the iron bearing materials is that they contain at least 50% by weight of iron itself in the final blend of these materials. Based upon the general availability of materials a blend of finely divided iron bearing materials such as follows will do very well:

| | Percent |
|---|---|
| Ore fines | 80 |
| Ore concentrate | 15 |
| Mill scale | 3 |
| Flue dust and shavings, chips, grindings and such | 2 |

Assuming the iron ore fines run about 62% in iron content, the other materials will boost this percentage somewhat to perhaps 65% total iron content in the combination of iron bearing materials. Of course, generally speaking, the higher the iron content, the more desirable the end product will be, so that the addition of greater quantities of such high iron content materials as mill scale and ore concentrates and shavings, chips and the like is desirable. However, the supply and demand law of economics will limit the quantities of these materials to whatever is available and as long as the total iron bearing materials contains at least 50% iron content, the final product will be quite satisfactory.

In accordance with the invention, the solid materials are to be mixed with molten slag. The amount of molten slag used is at least that amount which will fill all the voids in the solid materials. This minimum amount will vary somewhat in that there will be less void spaces in very fine solids as compared to somewhat coarser solids and therefore the minimum amount will vary in direct proportion to the coarseness of the solids employed. The volume of voids to be filled (and consequently the corresponding minimum amount of molten slag to be utilized) is readily computable from the physical volume characteristics of the solid materials used.

In addition to this, and in accordance with the invention, I add sufficient fluxing materials to provide enough flux to at least slag all of the silica content in the final product. It will be understood that the minimum amount of molten slag referred to above will provide a substantial amount of the fluxing material needed but that this would ordinarily not be enough and in the specific example cited hereinafter, it would only be about half enough. This additional flux can be added in the form of solids, such as limestone, chalk, marl and crushed sea shells, or can be added in the form of additional molten slag. It should be pointed out here that flux materials such as chalk, marl and sea shells cannot be used in ordinary furnace operation because of their fineness but are readily useable in the present invention. This flexibility in materials which my invention affords means that the user can employ the cheapest and/or most readily available flux materials and enjoy the attendant economies thereof. In the event flux in the form of solids is utilized to provide the additional flux for the final product, then an additional amount of molten slag should be included to fill the additional voids that would occur therefrom. Ordinarily this would amount only to about a 5% increase in the minimum quantity of molten slag.

A specific example follows:

| | (By Weight in Pounds) | | | | | | | | |
|---|---|---|---|---|---|---|---|---|---|
| | SiO$_2$ | CaO | MgO | Al$_2$O$_3$ | Mn | P | S | Fe | Total |
| A. Charge: | | | | | | | | | |
| 80% ore fines | 258 | | | 77 | 15 | 44 | | 1,599 | 2,578 |
| 15% Concentrate | 15 | | | 5 | 3 | | | 322 | 484 |
| 3% Mill scale | | | | | | | | 94 | 97 |
| 2% Flue dust | | | | | | | | 35 | 65 |
| Total | 273 | | | 82 | 18 | 44 | | 2,028 | 3,224 |
| B. Fuel | 120 | 3 | 2 | 68 | | 1 | 15 | 15 | 1,700 |
| Total SiO$_2$ | 393 | | | | | | | | |
| C. Flux For Above | | 408 | 58 | | | | 2 | | 880 |
| D. Recycled Slag | 288 | 328 | 48 | 120 | 2 | | 2 | | 704 |
| E. Briquette Composition | 561 | 736 | 106 | 202 | 20 | 44 | 2 | 2,028 | 4,089 |

The iron yield from the above briquette product is about 41%.

The weight shown in the extreme right column ("Total") of the preceding table are the actual amounts of the materials used to prepare and fire the briquettes. These materials are identified in the extreme left column ("A. CHARGE, B. FUEL . . ."). The amounts of the intermediate columns do not add up to the indicated totals, because the intermediate columns are not intended to represent complete analyses of the materials. For example, in regard to the iron-bearing materials constituting the "charge," the differences between the sums of the intermediate columns and their associated "Totals" represent substantially the weights of the oxygen removed from these materials in the conversion of their iron oxides to free iron.

In the foregoing specific example, it should be noted that I have taken into account also the additional silica that would be added to the materials by the fuel (coke) used in blast furnace operation. The fuel has not been added to the mix but only is listed to help determine the total amount of silica present in a blast furnace operation using my briquettes and consequently the total amount of flux needed to make the final product wholly self-fluxing. The computations for the amount of flux material to be added is purely a mathematical one based upon an analysis of the materials used and as such does not form a part of this invention, but rather is simply following knowledge based upon ordinary good practice.

It will be understood, therefore, first, that the minimum amount of molten slag used will depend on the volume of voids in the solid materials used to be filled by molten slag which is a simple volumetric calculation derivable from the physical characteristics of the solid materials used; and second, that the amount of additional molten slag or other flux materials necessary will be dependent upon the silica content of the materials being used in the operation which is determinable from a chemical analysis or knowledge of the materials used as well as the calcium and magnesium content of the flux materials employed.

Having made these determinations as to the amount of each material to be mixed, the solids, if more than one is employed, are preferably dry mixed in any conventional manner and then mixed with the fluid molten slag, preferably in a jet aspirator type mixer under a partial vacuum, so that the voids or air bubbles are minimized and the solid materials are thoroughly mixed into the molten slag which fills the voids and acts as a matrix for the solids. The resulting mix is in a fluid (albeit, very viscous) state and is then run through a briquetting machine and formed into briquettes. Such mixing and briquetting machines are equipment well known to the art and will not be herein further described. Thereafter, the briquettes are allowed to cool and harden into a dense, abrasion resistant self-fluxing feed stock of uniform size and composition. The final feed stock so produced has a controlled chemical analysis of uniform content and quality of good to excellent iron content and most useful in iron and steel producing furnaces. I thereby produce useful briquettes of materials which in their ordinary state are unuseable in producing iron and steel while wholly avoiding the expensive sintering processes otherwise employed to utilize these materials.

While I have shown and described a present preferred embodiment of the invention and have illustrated a present preferred method of practicing the same, it is to be distinctly understood that the invention is not limited thereto but may be otherwise variously embodied and practiced within the scope of the following claims.

I claim:

1. A method of making self-fluxing feed stock for iron and steel producing furnaces comprising mixing a quantity of finely divided iron-bearing material of at least 50% iron content together with flux-containing material in an amount sufficient to make the final mixed material self-fluxing, at least a portion of said flux-containing material being molten slag in a quantity sufficient at least to fill the void spaces between the solid materials and form a matrix therefor, forming briquettes of the mix, and thereafter allowing the briquettes to cool and harden, said mixing with the molten slag being accomplished under a partial vacuum.

2. A method of making self-fluxing feed stock for iron and steel producing furnaces, said method comprising the steps of mixing a quantity of finely divided iron-bearing material together with a quantity of molten flux-containing material, said molten material being sufficient in quantity at least to fill the void spaces between the particles of said iron-bearing material and thereby to form a matrix therefor, forming briquettes of the mixture thus formed while still fluid, and thereafter allowing the briquettes to cool and harden, said mixing with molten material being accomplished under a partial vacuum.

3. The method according to claim 2 wherein said molten material contains a quantity of fluxes in proportion to the amount of impurities in said iron-bearing material so that said briquettes will be completely self-fluxing relative to said impurities.

4. The method according to claim 2 wherein said briquettes are for use in blast furnace operations, and said molten material contains sufficient flux material both to flux the silica contained in said iron-bearing material and to flux a portion of the silica contained in the coke employed as fuel in said blast furnace operations.

5. The method according to claim 2 wherein said finely divided iron-containing material is selected from the group consisting of iron ore fines, iron ore concentrates, mill scale, flue dust and other finely divided iron-bearing material, such as shavings, chips, grindings and the like.

6. The method according to claim 5 wherein at least two iron-bearing materials are selected and are uniformly blended before addition to said molten material.

7. A method of making self-fluxing feed stock for iron and steel producing furnaces comprising mixing a quantity of finely divided iron-bearing material of at least 50% iron content together with flux-containing material in an amount sufficient to make the final mixed material self-fluxing, at least a portion of said flux-containing material being molten slag in a quantity sufficient at least to fill the void spaces between the solid materials and form a matrix therefor, forming briquettes of the mix, and thereafter allowing the briquettes to cool and harden, said mixing with the molten slag being accomplished in a jet aspirator mixer under a partial vacuum.

References Cited by the Examiner

UNITED STATES PATENTS

| 287,117 | 10/1883 | Fronheiser | 75—3 |
| 516,710 | 3/1894 | Sanders | 75—3 |
| 792,449 | 6/1905 | Pohl | 75—3 |
| 2,133,751 | 10/1938 | Millward | 75—3 |

FOREIGN PATENTS

| 2,747 | 1891 | Great Britain. |
| 427,567 | 4/1935 | Great Britain. |

BENJAMIN HENKIN, *Primary Examiner.*

DAVID L. RECK, *Examiner.*